United States Patent
Shimizu et al.

(10) Patent No.: US 6,645,405 B2
(45) Date of Patent: Nov. 11, 2003

(54) WEIGHING METHOD IN PREPLA TYPE INJECTION MOLDING MACHINE

(75) Inventors: Hisato Shimizu, Nagano-ken (JP); Hiroshi Koizumi, Nagano-ken (JP); Kazutoyo Kobayashi, Nagano-ken (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 100 days.

(21) Appl. No.: 09/883,706

(22) Filed: Jun. 18, 2001

(65) Prior Publication Data
US 2002/0011682 A1 Jan. 31, 2002

(30) Foreign Application Priority Data
Jun. 23, 2000 (JP) .......................... 2000-189424

(51) Int. Cl.$^7$ ............................... B29C 45/77
(52) U.S. Cl. ............... 264/40.1; 264/328.19; 425/145; 425/147
(58) Field of Search ............... 264/40.1, 328.1, 264/328.19; 425/145, 146, 147

(56) References Cited

U.S. PATENT DOCUMENTS 6,042,760 A  *  3/2000  Nakazawa et al. ......... 264/40.1
6,284,167 B1 *  9/2001  Fujikawa ..................... 264/39

* cited by examiner

Primary Examiner—Jill L. Heitbrink
Assistant Examiner—Monica A Fontaine
(74) Attorney, Agent, or Firm—Weingarten, Schurgin, Gagnebin & Lebovici LLP

(57) ABSTRACT

An unstable weighing due to the plunger sliding resistance in a prepla type injection molding machine is prevented by dividing control of the plunger retraction movement for the weighing into speed control and pressure control. A plastic resin supply start position and a forced retraction release position are set along the way of the plunger retraction stroke by reference to a weighing start position. A plunger is moved from the weighing start position after injection and pressure-keeping to a weighing stop retraction position. Plastic resin is supplied to the forward portion of the injection cylinder when the plunger attains the supply start position from the weighing start position. The plunger is moved by forced retraction up to the forced retraction release position by speed control; the weighing is stabilized by changing the speed control to the pressure control once the plunger attains the forced retraction release position.

1 Claim, 3 Drawing Sheets

(A)

(B)

(A)

(B)

WEIGHING METHOD IN PREPLA TYPE INJECTION MOLDING MACHINE

BACKGROUND OF THE INVENTION

1. Field of the Invention

The present invention concerns a weighing method for the prepla type injection molding machine comprising both plasticating apparatus and an injection apparatus.

2. Detailed Description of the Prior Art

In the prepla type injection molding machine, plastic resin by screw rotation is supplied to the injection cylinder forward portion from the plastication cylinder through a resin path. Plastic resin is weighed by accumulation in the forward portion of the injection cylinder by retracting the plunger at the weighing start position by resin pressure. The plunger is advanced by blocking the resin path after the weighing. Plastic resin is injected and charged into the die from an injection cylinder end nozzle.

The plunger after this injection and filling is in the most advanced position thereof, but the plunger retracts slightly to the place where a pressure is mitigated by resin counterforce generated by decompression after the completion of injection pressure-keeping, and almost at the same time, the resin path is opened to start supplying plastic resin.

The plunger retraction weighing only by resin pressure makes the density of plastic resin weighed there unstable; therefore, a fixed backpressure is applied to the plunger, and the plastic resin supply is stopped, when the plunger attains a predetermined weighing stop position under this backpressure control.

For the aforementioned screw, there are both a type wherein resin is plasticized by rotating at a fixed position and, at the same time, plastic resin is supplied to the injection cylinder by discharge pressure, and a inline screw method where plastic resin is accumulated in the screw forward portion by retracting under resin pressure all the way rotating, and supplied by forward movement. In either of these types, plastic resin supply starts by opening the resin path.

In such method of the prior art, the resin weighing (weighing time, weighing density, resin temperature, or other) may become irregular, often making it difficult to obtain a good product continuously. It is supposed that, according to resins, a minute change of sliding resistance or others of the whole apparatus retracted by the plunger sliding resistance or resin supplied from the screw provokes backpressure variation, and changes the plastic resin feed state by screw rotation or forward movement.

SUMMARY OF THE INVENTION

The present invention is devised to solve the problem of the weighing discrepancy of the aforementioned prior art and has as an object to provide a weighing method for the prepla type injection molding machine that can cancel the influence of the plunger sliding resistance and stabilize the weighing, by controlling the plunger retraction movement for the weighing by dividing the control into speed control and pressure control.

The present invention according to the aforementioned object, is a weighing method for a prepla type injection molding machine, comprising both a plasticating cylinder with an internal screw and an injection cylinder with an internal plunger, for supplying a forward portion of the injection cylinder with plastic resin by screw revolution or advancement, and injecting plastic resin by advance of the plunger after blocking the resin passage, comprising the steps of:

setting sequentially a plastic resin supply start position and a forced retraction release position along the way of the plunger retraction stroke by reference to a weighing start position;

weighing plastic resin by moving the aforementioned plunger from a weighing start position after injection and pressure-keeping to a weighing stop retraction position and starting to supply the forward portion of the injection cylinder with plastic resin when the plunger attains the supply start position from the weighing start position, by forced retraction of the plunger up to the forced retraction release position thereof by speed control; and stabilizing the weighing by changing the speed control to the pressure control once the plunger attains the forced retraction release position.

DETAILED DESCRIPTION OF THE PREFERRED EMBODIMENT

Figure 1:
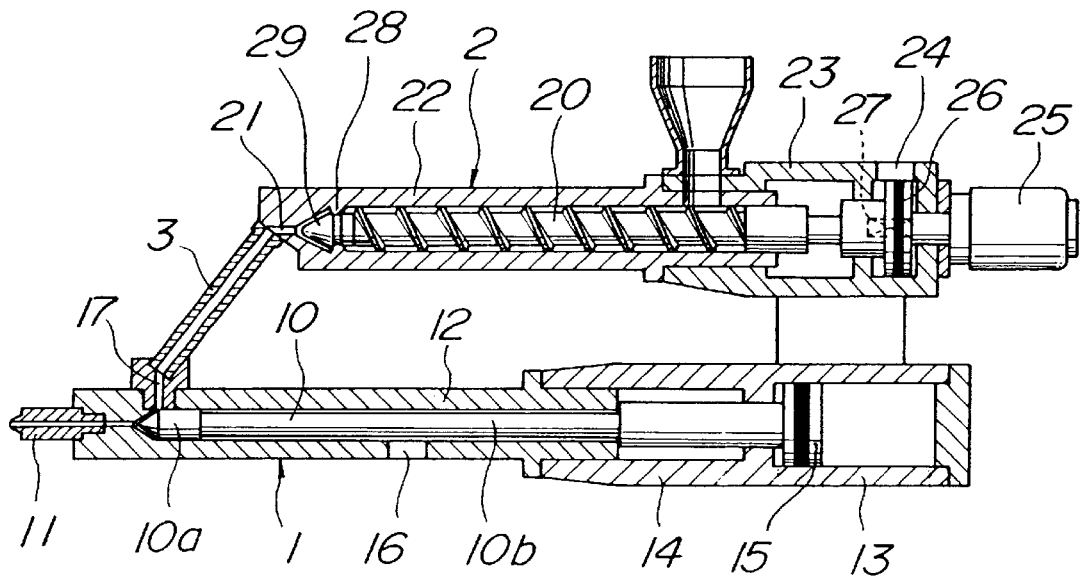
FIG. 1 is a schematic longitudinal cross section illustration of the prepla type injection molding machine according to an object of the present invention.

In the drawing, 1 is an injection apparatus, and 2 is a plastication apparatus juxtaposed on the injection apparatus, and both apparatuses communicate through a resin path 3 provided over the extremity portion.

Said injection apparatus 1 has an inner plunger for injection 10 capable of advancing and retracting, and further comprises an injection cylinder 12 provided with a nozzle 11 at the extremity, a hydraulic cylinder 13 provided behind this injection cylinder, and a holder member 14 integral with the forward portion of this hydraulic cylinder 13 and engaging and holding the rear end portion of the injection cylinder 12.

Said plunger 10 comprises a head portion 10a at the extremity, and a shaft portion 10b formed smaller in diameter than the head portion 10a, and the shaft portion rear end is coupled with the extremity portion of the piston 15 of the hydraulic cylinder 13 in the rear portion of said holder member 14. A clearance is formed between an inner peripheral wall of the injection cylinder 12, by the small diameter shaft portion 10b, and resin entered into the clearance is fed sequentially backward when the plunger retracts and discharged outside through a rear opening 16.

Said plastication apparatus 2 has a rotatable screw for plastication 20, comprises a plastication cylinder 22 having a discharge path 21 to the extremity, a holder portion or cylinder 23 at the rear end portion for holding this plastication cylinder 22, a hydraulic cylinder 24 for screw movement coupled to the rear end of the holding cylinder 23 and a motor for screw rotation 25, that couples said screw 20 rear end with the piston 26 of this hydraulic cylinder 22 inside said holding cylinder 23, and at the same time, couples with a driving shaft 27 of a motor 25 and a piston 26 slidable in the axial direction, allowing the screw 20 to rotate with the piston 26.

Said resin path 3 comprises an inflow path 17 disposed above and in advance of the plunger limit position of the extremity portion of the injection cylinder 12, and a piping provided at a slant across said discharge path 21 of the plastication apparatus 2, and plastic resin by the screw 20 rotation is supplied into the extremity portion of the injection cylinder 12 through the resin path 3.

The injection machine of the embodiment shown in FIG. 1 forms a valve seat 28 at the inner periphery of the extremity of the plastication cylinder 22 connecting with said discharge path 21, and forms the screw extremity portion 29 into a mushroom shaped valve disk, to open the valve by advancement of said piston 26 for weighing, and to close the valve by retraction movement for other than weighing.

Figure 2:
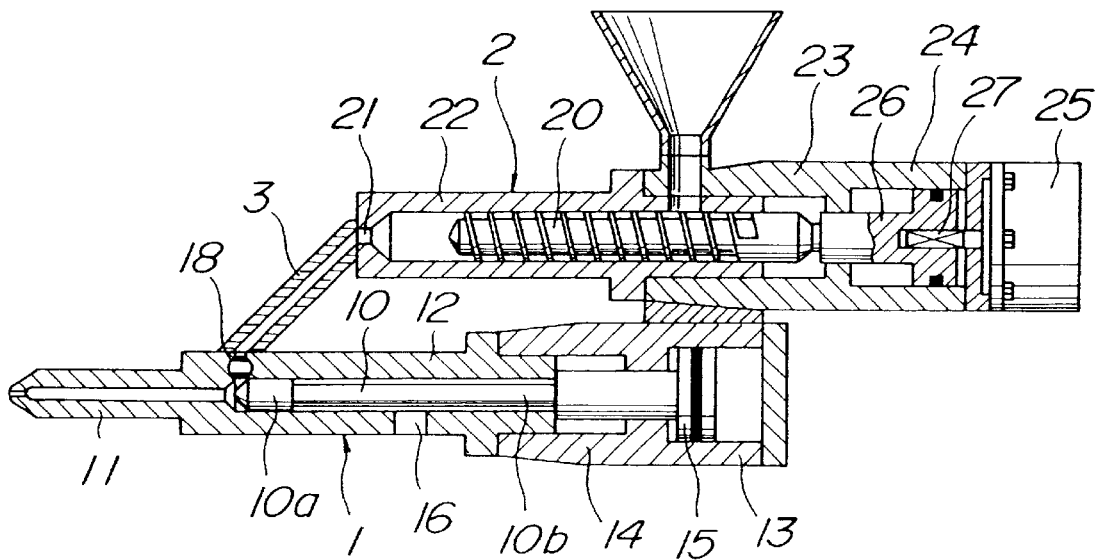
FIG. 2 is also a schematic longitudinal cross section illustration of the prepla type injection molding machine of another embodiment.

The injection machine of the embodiment shown in FIG. 2 has a structure to plasticate resin by rotation of the screw 20, accumulating the same all the way in the screw forward portion, and retract the screw 20 by resin pressure, and to supply the injection cylinder 12 with plastic resin, by advancement of the screw. The inflow path 17 shown in FIG. 1 is provided with an opening/closing valve 18, and the weighed resin is injected and charged by blocking the resin path 3 by this opening/closing valve 18.

Weighing of plasticated resin in these injection machines is performed by moving said plunger 10 from a weighing start position after injection pressure-keeping to a retraction stop position after weighing stops.

Figure 3:
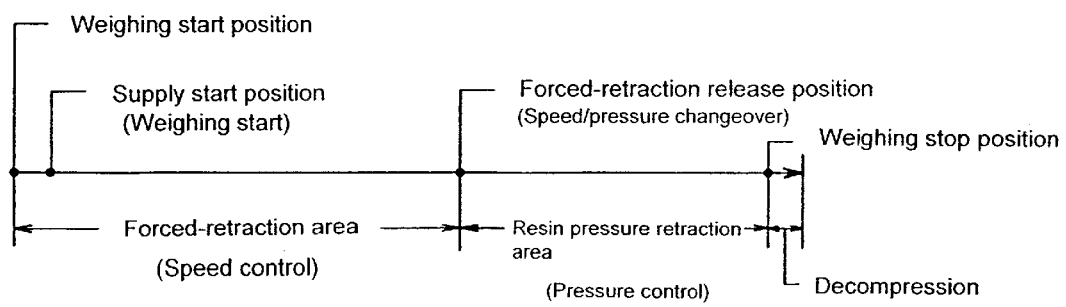
FIG. 3 illustrates the stroke of the weighing method of the present invention.

This weighing is performed by, first as shown in FIG. 3, setting sequentially a plastic resin supply start position and a forced retraction release position along the way of the plunger retraction stroke by reference to the weighing start position, and forcedly retracting the plunger 10 from the weighing start position to the forced retraction release position, by the piston 15 of said hydraulic cylinder 13. This forced retraction is performed by speed control.

It is set so that the plunger 10 retracts from the forced retraction release position to a weighing stop position by supply resin pressure and the backpressure control can be performed by changing the control from speed to pressure. In case of decompressing after weighing completion, the retraction stroke for decompression from the weighing stop position is set.

Thus, after injection and filling of the mold, the plunger 10 is in the most advanced position. Under such setting, the plunger 10 is decompressed after the injection pressure-keeping. Thereafter, the plunger 10 is retracted by forced retraction beginning from the weighing start position (see FIG. 3) by the operation of said hydraulic cylinder 13 piston 15. In the embodiment of FIG. 1, when the plunger 10 attains said supply start position, the screw 20 advances by the advancement of said hydraulic cylinder 24 piston 26 and the valve that had been closed by the screw extremity portion 29 during injection filling is changed over to the valve open position, and the screw 20 rotates with the piston 26 according to said motor 25, to plasticate resin and supply the injection cylinder 12 with plastic resin.

In the embodiment shown in FIG. 2, the resin path 3 blocked by said opening/closing valve 18 is released, and plastic resin accumulated in the screw forward portion is supplied to the injection cylinder 12 by forward movement of the screw 20.

In both of the aforementioned embodiments, resin is supplied to the injection cylinder 12 by the plastication apparatus 2 side discharge pressure or extrusion force, and plastic resin is charged in the forward portion of the injection cylinder 12, the capacity of which is increased by forced retraction of the plunger, with an inflow speed slightly less than the forced retraction speed of the plunger.

Consequently, there is no more supply amount discrepancy due to plunger sliding resistance, because the weighing filling resin pressure does not act directly as a plunger 10 retraction force as in the prior art.

In addition, plastic resin is not supplied until the plunger 10 retracts to the supply start position, the plunger forward portion cylinder capacity is increased so far after the retraction of set distance, and the plunger forward portion residual resin is in rough state; therefore, even if the resin path 3 resin pressure increases before supply starts according to the valve opening, the plunger 10 movement in the beginning of weighing does not become unstable under the influence thereof.

For instance, in the embodiment of FIG. 1, residual resin in the forward portion of the screw extremity 20 is pressed and the resin pressure increases in the resin path 3, because resin is plasticized and supplied by the screw 20 rotation, after having separated the screw extremity portion 29 from the disk seat 28 to open the valve by advancing the screw 20; however, as the plunger forward portion cylinder capacity is being increased, the resin pressure is necessarily lowered and does not act as a plunger 10 retraction force, and the plunger 10 retracts with a constant speed, thereby preventing the plunger 10 from unstable movement which, otherwise, tends to occur in the beginning of weighing.

In the embodiment of FIG. 2, the backpressure during plastication increases the resin pressure in the resin path 3 and affects the plunger 10 according to the opening of the opening/closing valve 18 before supply start; however, as the plunger forward portion cylinder capacity is being increased as in the case of FIG. 1, the resin pressure is lowered and does not act as a plunger 10 retraction force, and the plunger 10 retracts with a constant speed, thereby preventing the plunger 10 from unstable movement which, otherwise, tends to occur in the beginning of weighing, also in the embodiment of FIG. 2.

Further, even when sliding resistance is generated by the plunger 10, its influence is eliminated by the forced retraction, thereby keeping constant the plunger 10 retraction speed in the forced retraction area. Therefore, plastic resin feed state change due to plunger sliding resistance supposed to be a factor of weighing discrepancy is improved, and the weighing is always performed without supply amount.

Next, when the plunger 10 attains the forced retraction release position, the retraction control changes from speed to pressure, and thereafter, in the resin pressure retraction area, the plunger 10 control becomes pressure control. In this area, when plastic resin is being weighed under the backpressure by the plunger 10, the plastic resin density is kept constant up to the weighing stop, even if resin supply density becomes irregular in the forced retraction area depending on the plastication apparatus 2 side pressure.

When the plunger 10 retracts to the weighing stop position, resin supply from the plastication cylinder 22 is stopped. In the embodiment of FIG. 1, the screw 20 rotation stops to stop the plastication, and following this, the screw 20 retraction movement the valve is opened by the screw extremity portion 29, to close the resin path 3. In the embodiment of FIG. 2, said opening/closing valve 18 closes to shut the resin path 3 and, thereafter, the screw 20 rotates to plasticate the resin.

In any of these embodiments, resin backflow to the plastication apparatus 2 side is prevented during weighed resin injection and filling, by blocking the resin path 3 after the weighing stop, and excess resin suction by decompression after the weighing stop is prevented, thereby preventing weighed resin from becoming excessive or insufficient. Moreover, as necessary, the weighed resin injection and filling starts by the plunger 10 forward movement after the decompression.

Figure 4:
FIG. 4 shows the product weight comparison of the resin weighing by the present invention (A) and the resin weighing by the prior art (B)
Figure 4:
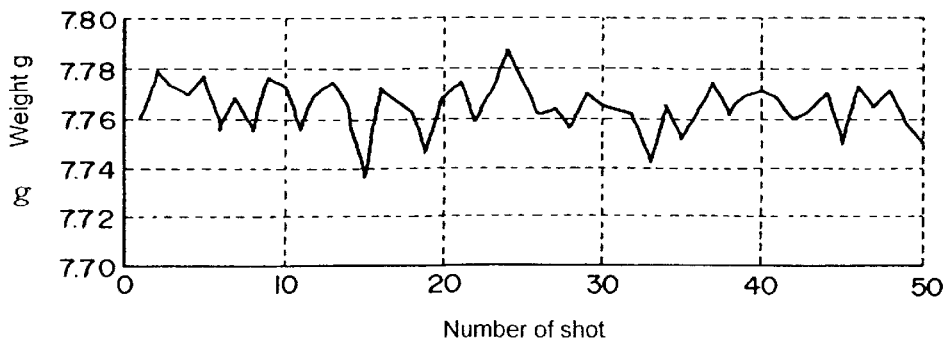

FIG. 4 shows the weighing state in the resin weighing by the present invention (A) and the resin weighing by the prior art (B) in respect of the product weight, and as it is obvious from the comparison of variation in both drawings (A), (B), the weighing discrepancy is improved in the present invention and more stabilized than the conventional (B).

Figure 5:
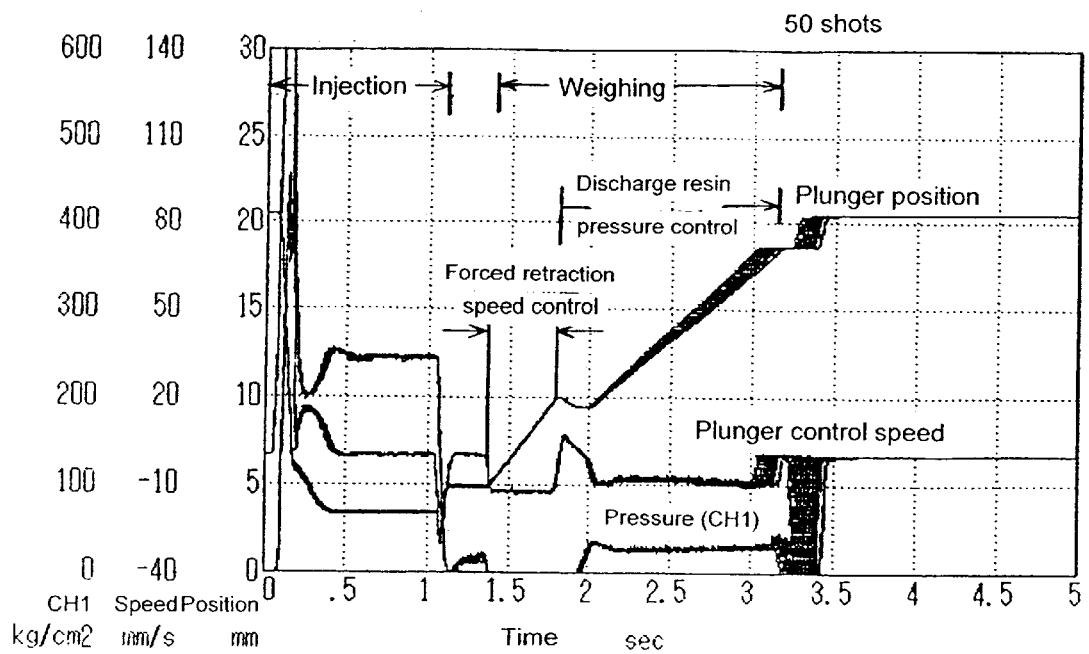
FIG. 5 shows a comparison of plunger speed, plunger position and pressure waveform in the resin weighing by the present invention (A) and the resin weighing by the prior art (B).
Figure 5:
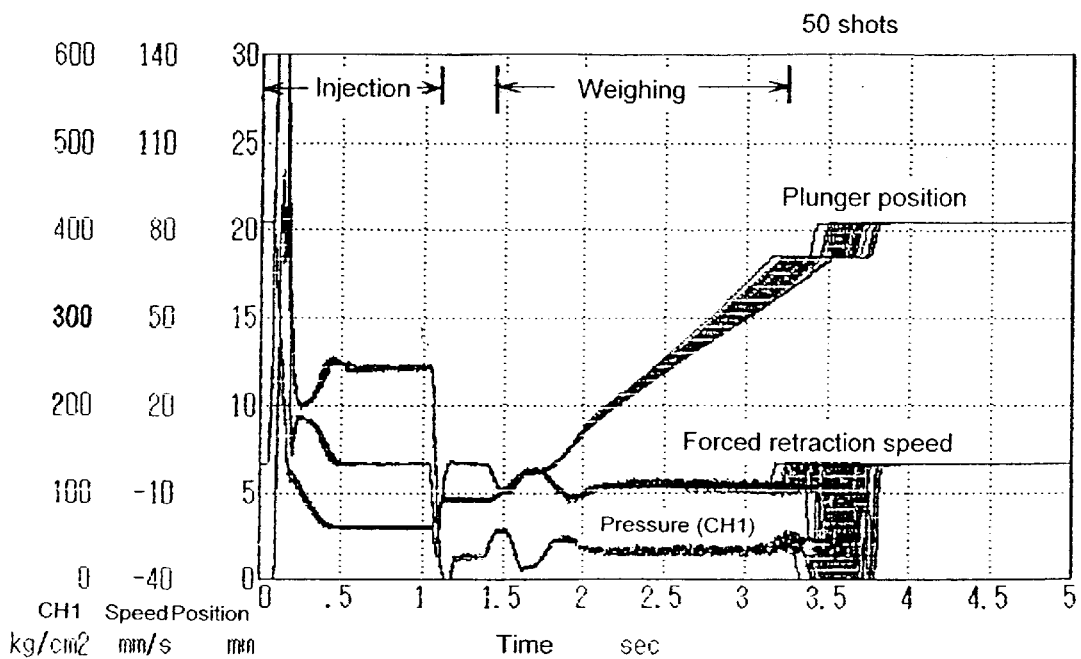

FIG. 5 shows the plunger speed, plunger position and pressure waveform in the resin weighing by the present invention (A) and the resin weighing by the prior art (B), and as it is obvious from the comparison of variation in both drawings (A), (B), the pressure variation is improved in the present invention and the discrepancy is smaller than the conventional (B), thereby keeping an extremely stable state.

EXAMPLE

| Molding machine | Embodiment of FIG. 1 (ES400/TM2E made by Nissei Jushi Kogyo Co., Ltd.) |
|---|---|
| Material resin | LCP liquid crystal polymer |
| Product weight | about 6 g |
| Screw speed | 260 rpm |
| Plunger retraction distance | 18 mm |
| Forced retraction distance | 10 mm |
| Plunger retraction speed | 12 m/sec |
| Plunger backpressure | 30 Kgf/cm2 |
| Weighing speed (plunger retraction speed by resin) | 9 mm/sec |

What is claimed is:

1. A weighing method for a prepla type injection molding machine, comprising both a plasticating cylinder having an internal screw and an injection cylinder having an internal plunger, a forward portion of the injection cylinder supplied with plastic resin through a resin passage from the plasticating cylinder by revolution or advancement of the internal screw, and the plastic resin injected by advancement of the internal plunger after the resin passage has been blocked, comprising the steps of:

sequentially setting a supply start position of plastic resin and a forced retraction release position along a retraction stroke of the internal plunger, the retraction stroke having a weighing start position and a weighing stop position, the supply start position and the forced retraction release position set by reference to the weighing start position;

after injecting and pressure-keeping plastic resin into a mold, beginning to move said internal plunger from the weighing start position toward the weighing stop position;

during said movement of said internal plunger, beginning to supply the forward portion of the injection cylinder with plastic resin when the internal plunger attains the supply start position;

during said movement of said internal plunger, forcedly retracting said internal plunger by using a speed control from the weighing start position to the forced retraction release position; and stabilizing the weighing by changing the speed control to a pressure control once the internal plunger attains the forced retraction release position.

* * * * *